United States Patent [19]

Wollar

[11] Patent Number: 4,639,175
[45] Date of Patent: * Jan. 27, 1987

[54] SELF-SEALING EXPANSION RIVET ASSEMBLY

[75] Inventor: Burnell J. Wollar, Barrington, Ill.

[73] Assignee: Phillips Plastics Corp., Chippewa Falls, Wis.

[*] Notice: The portion of the term of this patent subsequent to Dec. 3, 2002 has been disclaimed.

[21] Appl. No.: 610,521

[22] Filed: May 15, 1984

[51] Int. Cl.$^4$ ............................................. F16B 13/04
[52] U.S. Cl. ...................................... 411/38; 411/43; 411/542
[58] Field of Search ...................... 411/32, 33, 34–38, 411/43, 70, 369, 368, 431, 508–510, 542; 285/161, 205, 206; 52/811

[56] References Cited

U.S. PATENT DOCUMENTS

| | | | |
|---|---|---|---|
| 2,371,452 | 3/1945 | Lees, Jr. | 411/70 |
| 3,030,705 | 4/1962 | Gill | 411/34 |
| 3,232,162 | 2/1966 | Ketchum | 411/70 |
| 3,300,798 | 1/1967 | York | 411/43 |
| 3,404,596 | 10/1968 | Ryder | 411/36 |
| 3,411,816 | 11/1968 | Andrews | 411/431 |
| 3,745,612 | 7/1973 | Seckerson | 411/509 |
| 4,074,608 | 2/1978 | Siebol | 411/43 |
| 4,222,304 | 9/1980 | Yoshida et al. | 411/43 |
| 4,427,328 | 1/1984 | Kojima | 411/508 |
| 4,472,097 | 9/1984 | Kiefer et al. | 411/369 |
| 4,556,351 | 12/1985 | Wollar et al. | 411/57 |

Primary Examiner—Gary L. Smith
Assistant Examiner—Neill Wilson
Attorney, Agent, or Firm—James E. Nilles; Thomas F. Kirby

[57] ABSTRACT

A self-sealing expansion rivet assembly comprises an expandable hollow plastic rivet and a plastic drive pin therefor. The rivet has a head and a slotted expandable shank for insertion in aligned holes in sheets which are to be joined together. The drive pin has a head and a serrated shank which, when inserted in the rivet bore and axially drawn thereinto by a tool, causes the pin head to engage the insertion end of the rivet shank and effect outward expansion of the rivet shank to fasten the sheets together, as well as break-off of the projecting end of the pin shank. The pin shank serrations engage a serrated reduced-bore portion in the rivet to hold the pin and rivet together permanently. Integrally formed annularly-shaped conical flexible liquid sealing flanges are provided on the rivet on, at or near the rivet head. As the rivet is expanded by the tool, the sealing flanges are forced against the adjacent panel around the hole therethrough to form a leak-proof seal.

4 Claims, 15 Drawing Figures

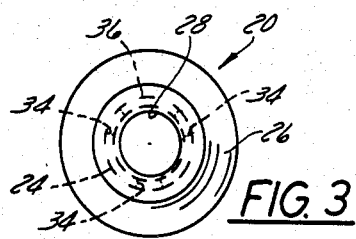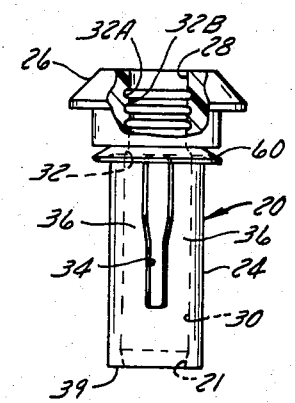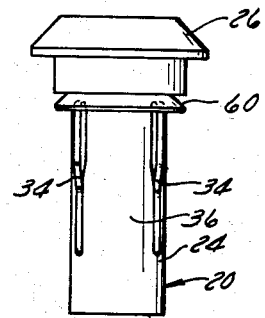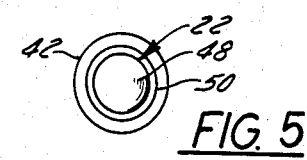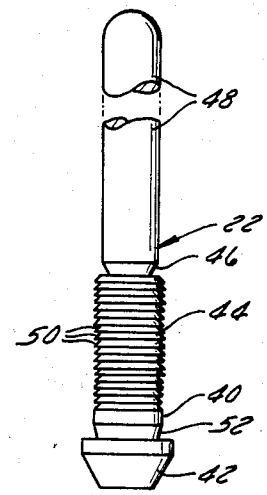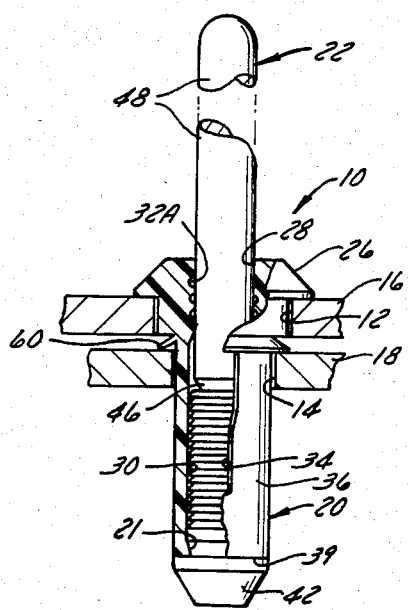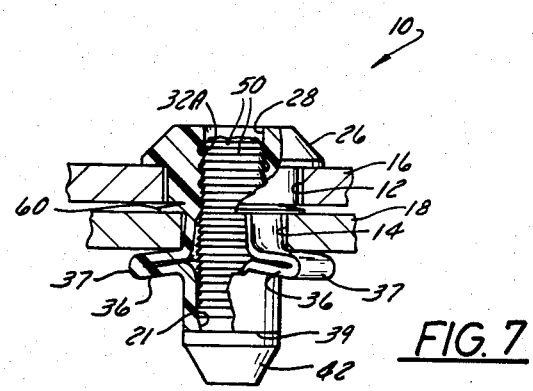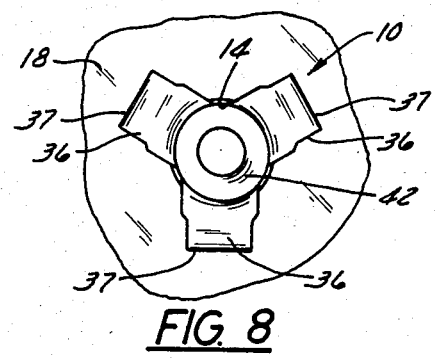

SELF-SEALING EXPANSION RIVET ASSEMBLY

BACKGROUND OF THE INVENTION

1. Field of Use

This invention relates generally to a fastener assembly commonly known as an "expansion rivet" or a "blind rivet" and comprising a hollow plastic expandable rivet insertable into aligned holes in panels and a plastic pin axially movable in the rivet to cause rivet expansion whereby the panels are secured together. In particular, the invention relates to integral flexible sealing means on the rivet to seal the panel holes in which the rivet is mounted.

2. Description of the Prior Art

Fastner assemblies of the aforesaid general character are known and in use., U.S. Patent application Ser. No. 371,652, now U.S. Pat. No. 4,556,351, for "EXPANSION RIVET ASSEMBLY" illustrates the state of the art, as well as an expansion rivet assembly over which the present invention is an improvement. That patent application is assigned to the same assigned or the present application. That patent application discloses an expansion rivet assembly which comprises two separately moloed plastic components, namely: an expandable hollow plastic rivet or female member and a plastic drive pin or male member. The rivet has a head or flange at one end and has a slotted shank insertable in aligned holes or slots in two or more flat sheetlike workpieces to be joined together. The rivet has a bore therethrough and the bore has portions of reduced diameter at opposite ends. The bore portion of reduced diameter near the head end of the rivet is provided with annular grooves. The drive pin has a head at one end and a shank which is extendable through the rivet bore. The drive pin shank has a first cylindrical portion, an adjoining second cylindrical portion of reduced diameter, and a break-away indentation located between the first and second portions. The first portion includes serrations and also a groove adjacent the pin head. The drive pin is adapted to be axially drawn into the bore in the rivet by a tool which engages the second cylindrical portion of the pin shank and which causes the drive pin head to engage the insertion end of the rivet shank and effect outward expansion of the rivet shank wall. Such movement also finally causes break-off of the now-superfluous projecting second cylindrical portion or end of the pin shank at the aforementioned break-away indentation formed in the pin shank. The reduced bore portion near the insertion end of the rivet engages the groove in the pin shank adjacent the pin head to temporarily hold the pin and rivet together prior to use. The serrations in the first portion of the pin shank, which are initially disengaged from the large diameter bore portion of the rivet, engage the grooved bore portion of reduced diameter at the head end of the rivet upon full insertion to hold the pin and rivet together permanently.

The fastener assembly disclosed in U.S. patent application Ser. No. 371,652 firmly and permanently secures two or more panels together in tight relationship and is well-adapted for use, for example, in automobile or domestic appliance construction to secure sheets of material or liners which line the interior of the automobile or appliance to other sheet metal panels or structural members. In some cases the panels are exposed to water or other liquids and there is a risk of liquid leakage through the aligned holes in which the rivet is mounted. If such leakage is undesirable because of possible damage to the panels or to objects near the panels, the hole can be sealed by means of a compressible washer or similar sealing device which is disposed on the rivet shank between the rivet head and the adjacent panel. This solution to the leakage problem requires an additional component and additional labor to install it and results in added costs.

SUMMARY OF PRESENT INVENTION

In accordance with the present invention there is provided an improved self-sealing expansion rivet assembly which is constructed so as to overcome the aforementioned leakage problems associated with some prior art "expansion rivets" or "blind rivets" and to provide other advantages.

An expansion rivet assembly in accordance with the invention comprises two separately molded plastic components, namely: an expandable hollow plastic rivet or female member and a plastic drive pin or male member. The rivet has a head or flange at one end and has a slotted shank insertable in aligned holes in workpieces to be joined. The rivet has a bore therethrough and the bore has portions of reduced diameter at opposite ends. Slots in the shank of the rivet allow it to expand, as hereinafter explained. The bore portion of reduced diameter near the head end of the rivet is provided with annular grooves. In accordance with the invention, integrally formed annularly-shaped flexible liquid sealing means are provided on the rivet on, at or near the head or flange. In a first embodiment of the invention the sealing means takes the form of an annular conically shaped flexible flange provided on the rivet shank between the head or flange and the slots in the shank. In a second embodiment of the invention, the sealing means takes the form of an annular conically shaped recess formed on the underside of the head or flange of the rivet to render the head flexible. In a third embodiment of the invention, the sealing means comprises both of the hereinbefore-mentioned forms. The drive pin has a head at one end and a shank which is extendable through the rivet bore. The drive pin shank has a first cylindrical portion, an adjoining second cylindrical portion of reduced diameter and a break-away indentation located between the first and second portions. The first portion includes serrations and also a groove adjacent the pin head. The drive pin is adapted to be axially drawn into the bore in the rivet by a tool which engages the second cylindrical portion of the pin shank and which causes the drive pin head to engage the insertion end of the rivet shank and effect outward expansion of the rivet shank wall. Such movement also finally causes break-off of the now-superfluous projecting second cylindrical portion or end of the pin shank at the aforementioned bread-away indentation formed in the pin shank. The reduced bore portion near the insertion end of the rivet engage the groove in the pin shank adjacent the pin head to temporarily hold the pin and rivet together prior to use. The serrations in the first portion of the pin shank, which are initially disengaged from the large diameter bore portion of the rivet, engage the grooved bore portion of reduced diameter at the head end of the rivet upon full insertion to hold the pin and rivet together permanently. As the rivet is expanded as hereinbefore-explained, the flexible annular sealing means are forced against the adjacent panel around the hole therethrough and form an effective leakproof seal therearound which prevents liquid from leaking through the panel hole from one side of the panel to the other. In the first and second embodiments the sealing means seal only the hole in one panel. In the first and third embodiments a seal is effectively located between two panels. In the third embodiment the sealing means separately seal each hole in the two panels which are joined together, thereby preventing liquid leakage through either or both holes into the space between the two panels which are joined together.

An expansion rivet assembly in accordance with the present invention offer several advantages over the prior art. For example, a self-sealing fastener assembly in accordance with the invention is economical to fabricate and use. It eliminates the need for a separate sealing component and the labor to install it. It also permits two separate seals to be effected by means of one rivet. It enables a seal to be located between two panels in a location which is otherwise virtually inaccessible for installation of conventional prior art seals such as washers or the like. It remains permanently emplaced once installed. Other objects and advantages of the invention will hereinafter appear.

DRAWINGS

FIG. 1 is a side elevation view of one side of a rivet for a self-sealing expansion rivet assembly in accordance with a first embodiment of the invention;

FIG. 2 is a view similar to FIG. 1 but showing another side of the rivet;

FIG. 3 is a plan view of the head end of the rivet of FIGS. 1 and 2;

FIG. 4 is a side elevation view of a drive pin for a self-sealing expansion rivet assembly in accordance with the invention;

FIG. 5 is an end view of the insertion end of the pin of FIG. 4;

FIG. 6 is a side elevation view, partly in section, of a self-sealing expansion rivet assembly in accordance with the first embodiment, and showing it associated with workpieces to be prior to expansion of the rivet.

FIG. 7 is a view similar to FIG. 6 but showing the assembly after expansion of the rivet compression of the sealing means and break-off of the pin;

FIG. 8 is a bottom plan view of the assembly of FIG. 7;

Figure 13:
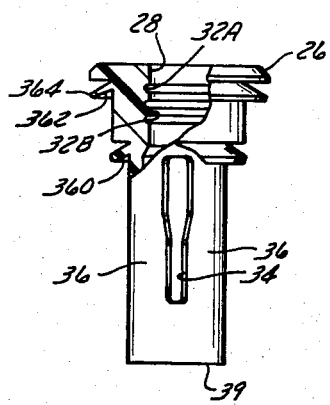
FIG. 13 is a side elevation view of one side of another form of rivet for a self-sealing expansion rivet assebly in accordance with a third embodiment of the invention.
Figure 14:
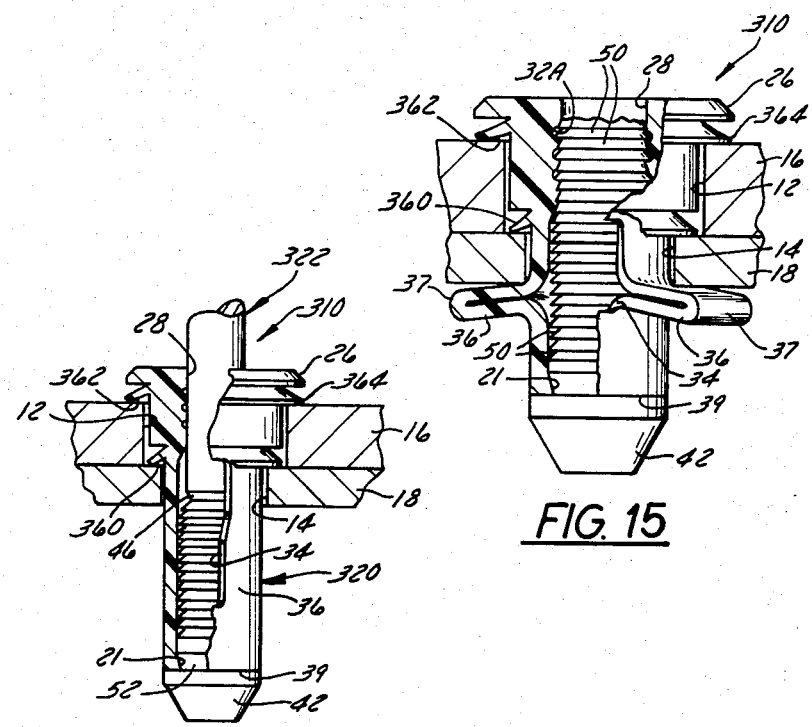
Figure 15:
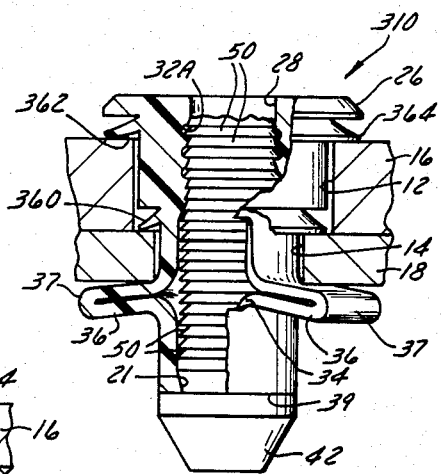

FIG. 14 is a side view, partly in section, of the rivet assembly in accordance with the third embodiment of the invention and employing the rivet of FIG. 13 and showing it associated with workpieces to be joined but prior to expansion of the rivet; and FIG. 15 is a side elevation view, partly in section, of the self-sealing expansion rivet assembly in accordance with the third embodiment of the invention, and showing it associated with workpieces to be joined after expansion of the rivet, compression of the sealing means and break-off of the pin.

DESCRIPTION OF PREFERRED EMBODIMENTS

First Embodiment

Referring to FIGS. 1 through 8, the numeral 10 designates self-sealing expansion rivet assembly in accordance with a first embodiment of the invention which is insertable through aligned holes 12, 14 in a plurality of (two) workpieces 16, 18, respectively, (see FIGS. 6, 7, 8) to secure the workpieces together firmly and permanently and to provide a liquid-tight seal for hole 14 in panel 18. FIG. 6 shows the expansion rivet assembly 10 disposed in the aligned workpiece holes 12, 14 but not yet expanded, whereas FIG. 7 shows the expansion rivet assembly 10 fully installed. The expansion rivet assembly 10 comprises two components, namely, a female member or expandable hollow plastic rivet 20 and an associated male member or plastic drive pin 22 which is insertable in the rivet and movable therein by a tool (not shown) axially relative to the rivet to effect expansion of the latter, as comparison of FIGS. 6 and 7 shows. Rivet 20 and pin 22 are made of relative hard but slightly flexible plastic such as Nylon TM acetal plastic material or the like and are formed separately by injection molding processes.

Rivet 20, which has a head end and an insertion end, comprises a clyindrical shank 24 and a head or flange 26 at or near the head end of the rivet and a cylindrical bore 28 extending entirely through the head and shank. Bore 28 includes a portion 30 and a reduced diameter bore portion 32 near the head end of the rivet 20. Bore portion 32 is provided with annular grooves 32A therein which define projections 32B therebetween. Bore 28 also includes another portion 21 of reduced diameter at or near the insertion end of rivet 20. Shank 24 also has a plurality (two or more) of elongated perforations or slots 34 extending through the shank wall and defining a plurality of (two or more) flexible wall portions 36 which fold outwardly during expansion of rivet 20, as FIGS. 7 and 8 show. Each flexible wall portion 36 includes a shoulder 37 along which it bends. The reduced diameter portion 21 in bore 28 is complementary to an indentation 52 in the shank 40 of the drive pin 22 and serves to hold the rivet 20 and pin 22 in temporary association. Furthermore, this widening of the shank wall at portion 21 also strengthens the wall and prevents outward bending of the shank wall under axial pressure when pin 22 is drawn thereagainst.

In accordance with the invention, integrally formed annularly-shaped flexible liquid sealing means are provided on rivet 20 on, at or near the head or flange 26. More specifically, in the first embodiment of the invention shown in FIGS. 1 through 8, the sealing means takes the form of an annular conically shaped outwardly extending flexible flange 60 provided on the rivet shank 24 between the head or flange 26 and the slots 34 in the shank 24.

Drive pin 22, which has a head end and an insertion end, comprises a clyindrical pin shank 40 having a head or flange 42 near its head end, a first or intermediate portion 44, a break-away indention 46 at one end of said intermediate portion to enable break-off of the superfluous projecting end of the pin shank by axial force and an adjoining smooth cylindrical tool-engageable protruding or second portion 48 near its insertion end. The intermediate portion 44 of shank 40 includes a plurality of peripheral gripping members or serrations 50 which take the form of axially spaced apart annular sharp-edged projections. Portion 44 of pin shank 40 also includes at its head end the aformentioned indentation 52. Indentation 52 in portion 44 is frictionally and releasably engageable with the projection or reduced diameter bore portion 21 in rivet 20 to maintain rivet 20 and pin 22 in association with each other prior to use, as FIG. 6 shows. The diameter of portion 44 (and its serrations 50) is smaller than the diameter of the bore portion 30 in rivet 20 but is larger than bore portion 32. The gripping members 50 are engageable with the projections 32B in reduced diameter bore portion 32 after axial movement of the pin effects expansion of the rivet 20 to hold the pin and the rivet together permanently. The serrations 50 are the same diameter as pin shank 40 but the shank portion 48 is of slightly smaller diameter so as to fit snuggly in narrower bore portion 32. Bore portion 30 does not, however, engage the serrations 50. The break-away indentation 46 is located on the pin shank 40 in that portion which is above the gripping members or serrations designated 50.

As the rivet 20 is expanded as hereinbefore-explained, the flexible annular sealing means or flange 60 is forced against the adjacent panel 18 around the hole 14 therethrough and forms an effect leak-proof seal therearound which prevents liquid from leaking through the panel hole 14 from one side of the panel 18 to the other. In the first embodiment the sealing means seal only one panel hole i.e., hole 14 in panel 18.

Self-sealing expansion rivet assembly 10 operates and is used as follows. Initially assume that rivet 20 and drive pin 22 are separated from each other, as is the case immediately after they are independently manufactured. For convenience and to prevent loss or misplacement of either component, the pin 22 is inserted, either manually or by machine assembly, in the bore 28 of rivet 20 to the position shown in FIG. 6 wherein portion 21 in bore 28 frictionally engages the indentation 52 in pin 22 and the pin head 42 bears against the insertion end surface 39 of rivet 20. In this pre-assembled condition, the assembly 10 is then inserted into the aligned hole 12, 14 in the adjacent workpieces 16, 18, respectively, as FIG. 6 shows, and wherein the underside of the rivet head 26 bears against a surface of workpiece 16. As FIG. 6 also shows, the tool-engageable portion 48 of pin shank 40 extends outwardly of the head end of the bore 28 of rivet 20 and expansion rivet assembly 10 is in readiness to be acted upon by a tool (not shown), which is conventional and used in the fastener trades to effect rivet expansion. Such tool comprises two relatively movable components (not shown), one of which forces rivet head 26 firmly against workpiece 16, while the other of which simultaneously grips portion 48 of pin 22 and pulls it axially (and upwardly relative to FIG. 6) in bore 28 to rivet 20. Such pin movement causes pin head 42 to move against end 39 of rivet shank 24 thereby causing the flexible wall portions 36 to fold to the position shown in FIGS. 7 and 8, whereby the workpieces 16, 18 are trapped between rivet head 26 and the folded wall portions 36. As pin 22 moves axially from the position shown in FIG. 6 to that shown in FIG. 7, the pin shank 40 moves outwardly of rivet bore 28, the serrations 50 move into tight engagement with the wall of reduced diameter bore portion 32, and the break-away indentation 46 moves even with the top surface of rivet head 26. In this condition, the pin 22 is no longer movable axially in either direction in bore 28 of rivet 20. Further axial pulling on pin 22 by the tool (not shown) results in pin portion 48 separating from pin portion 44 in the region of the break-away indentation 46, as FIG. 7 shows. Since rivet 20 and pin 22 are ow held together under relatively high force, and since the plastic of which the rivet and pin are made is somewhat "flowable" over a period of time (one or two days) when under pressure, two things occur: first, the wall of narrow bore portion 32 flows between the pin serrations 50 making component separation impossible without rivet assembly destruction; and, second, portion 21 of the end 39 of rivet shank 24 of rivet 20 flows into the recess 52 beneath pin head 42 of pin 22 thereby resulting in even additional tight engagement between the rivet and pin.

Second Embodiment

Figure 10:
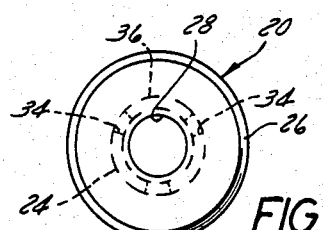
FIG. 10 is a plan view of the head end of the rivet of FIG. 9.
Figure 9:
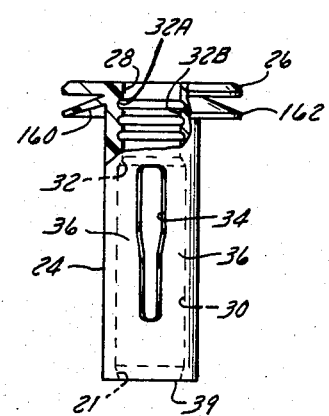
FIG. 9 is a side elevation view of one side of another form of rivet for a self-sealing expansion rivet assembly in accordance with a second embodiment of the invention.
Figure 11:
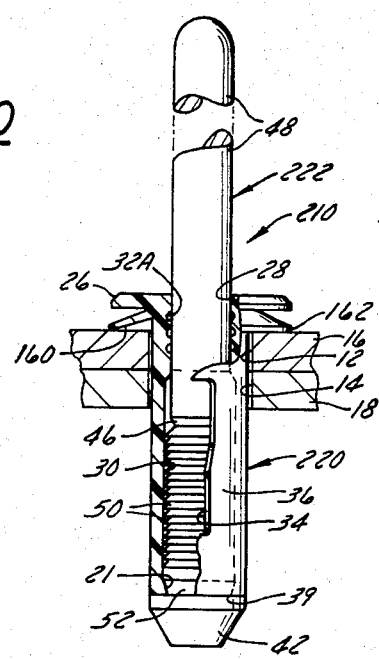
FIG. 11 is a side elevation view, partly in section, of the self-sealing expansion rivet assembly in accordance with the second embodiment of the invention, and showing it associated with workpieces to be joined but prior to expansion of the rivet.
Figure 12:
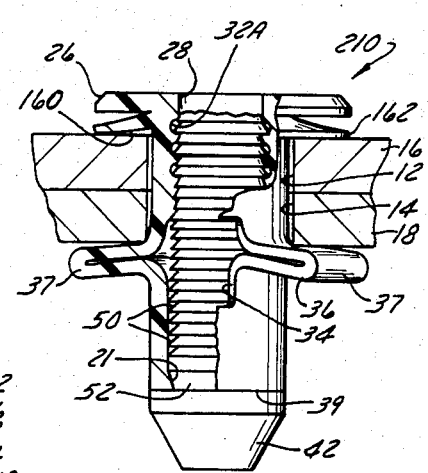
FIG. 12 is a view similar to FIG. 11 but showing the assembly after expansion to the rivet, compression of the sealing means and break-off of the pin.

Referring to FIGS. 9 through 12, the numeral 210 designates a self-sealing expansion rivet assembly in accordance with a second embodiment of the invention which is insertable through aligned holes 12, 14 in a plurality of (two) workpieces 16, 18 respectively, (see FIGS. 11 and 12) to secure the workpieces together firmly and permanently. FIG. 11 shows assembly 210 in the holes 12, 14 but not yet expanded, whereas FIG. 12 shows the assembly fully installed. Rivet assembly 210 comprises an expandable hollow plastic rivet 220 and an associated plastic drive pin 222 which is movable by a tool (not shown) axially relative to the rivet to effect expansion of the latter, as comparison of FIGS. 11 and 12 shows. Rivet 220 and pin 222 are made of plastic such as Nylon TM or the like and are formed separately by injection molding processes. Rivet 220 comprises shank 24 having a head 26 near on end and a bore 28 extending through the head and shank. Bore 28 includes a wider portion 30 and a reduced diameter bore portion 32 near the end of the shank 24 nearest head 26. Bore portion 32 is provided with annular grooves 32A therein which define projections 32B therebetween. Shank 24 also has a plurality of (two or more) elongated perforations 34 extending through the shank wall and defining a plurality of (two or more) flexible wall portions 36 which fold outwardly during expansion of rivet 220, as FIG. 12 shows. Each flexible wall portion 36 includes a shoulder 37 along which it bends.

In accordance with the invention, integrally formed annularly-shaped flexible liquid sealing means are provided on the rivet 220 on, at or near the head or flange 26. In the second embodiment of the invention, the sealing means takes the form of an annular conically shaped recess 160 formed on the underside of the head or flange 26 of the rivet 220. The relief provided by the recess 160 enables the outer peripheral portion or edge 162 of head 26 to flex.

Drive pin 222 is substantially identical to pin 22 hereinbefore described. The intermediate portion 44 of shank 40 includes a plurality of peripheral gripping members or serrations 50 which take the form of axially spaced apart annular sharp-edged projections. The groove 52 in the pin 222 is releasably engageable with reduced diameter bore portion 21 in the rivet 220 to maintain rivet 220 and pin 222 in association with each other prior to use, as FIG. 11 shows. The gripping members 50 are engageable with the projections 32B in reduced diameter bore portion 32 after axial movement of the pin effects expansion of the rivet 220 to hold the pin and the rivet together permanently. The serrations 50 are the same diameter as pin shank 40 but the shank portion 48 is narrower and fits slidingly in narrower bore portion 32.

As the rivet 222 is expanded as hereinbefore-explained, the flexible annular sealing means in the form of the flexible peripheral edge 162 of head 26 is forced against the adjacent panel 16 around the hole 12 therethrough and form an effect leak-proof seal therearound which prevents liquid from leaking through the panel hole 12 from one side of the panel 16 to the other. In the second embodiment the sealing means seals only one hole in one panel i.e., hole 12 in panel 16. In the second embodiment the seal is effectively located outside one panel.

Third Embodiment

Referring to FIGS. 13 through 15, the numeral 310 designates a self-sealing expansion rivet assembly in accordance with a third embodiment of the invention which is insertable through alligned holes 12, 14 in a plurality of (two) workpieces 16, 18, respectively, (see FIGS. 11 and 12) to secure the workpieces together firmly and permanently. FIG. 14 shows assembly 310 in the holes 12, 14 but not yet expanded, whereas FIG. 15 shows the assembly fully installed. Rivet assembly 310 comprises an expandable hollow plastic rivet 320 and an associated plastic drive pin 322 which is movable by a tool (not shown) axially relative to the rivet to effect expansion of the latter, as comparison of FIGS. 11 and 12 shows. Rivet 320 and pin 322 are made of plastic such as Nylon TM or the like and are formed separately by injection molding processes. Rivet 320 comprises shank 24 having a head 26 near one end and a bore 28 extending through the head and shank. Bore 28 includes a wider portion 30 and a reduced diameter bore portion 32 near the end of the shank 24 nearest head 26. Bore portion 32 is provided with annular grooves 32A therein which define projections 32B therebetween. Shank 24 also has a plurality of (two or more) elongated perforations 34 extending through the shank wall and defining a plurality of (two or more) flexible wall portions 36 which fold outwardly during expansion of rivet 320, as FIG. 12 shows. Each flexible wall portion 36 includes a shoulder 37 along which it bends.

In accordance with the invention, integrally formed annularly-shaped flexible liquid sealing means are provided on the rivet 320 on, at or near the head or flange. More specifically, in the third embodiment of the invention the sealing means comprise an annular conically shaped outwardly extending flexible flange 360 provided on the rivet shank 24 between the head or flange 26 and the slots 34 in the shank 24. The sealing means further comprise an annular conically shaped recess 362 formed on the underside of the head or flange 26 of the rivet 320. The relief provided by the recess 362 enables the outer peripheral portion or edge 364 of head 26 to flex. In the third embodiment of the invention, the sealing means comprises both of the hereinbefore-mentioned forms.

Drive pin 322 is substantially identical to pin 22 hereinbefore described. The intermediate portion 44 of shank 40 includes a plurality of peripheral gripping members or serrations 50 which take the form of axially spaced apart annular sharp-edged projections. The groove 52 in the pin 322 is releasably engageable with reduced diameter bore portion 21 in the rivet 320 to maintain rivet 320 and pin 322 in association with each other prior to use, as FIG. 11 shows. The gripping members 50 are engageable with the projections 32B in reduced diameter bore portion 32 after axial movement of the pin effects expansion of the rivet 320 to hold the pin and the rivet together permanently. The serrations 50 are the same diameter as pin shank 40 but the shank portion 48 is narrower and fits slidingly in narrower bore portion 32.

As the rivet 320 is expanded as hereinbefore-explained, the flexible annular sealing means comprising flange 360 and head edge 364 are forced against the adjacent panels 18 and 16, respectively, around the holes 14 and 12, respectively therethrough and form an effect leak-proof seal therearound which prevents liquid from leaking through the panel holes 14 and 12 from one side of each panel to the other. In the third embodiment the sealing means separately seal each hole 14, 12 in the two panels 18, 16 which joined together, thereby preventing liquid leakage through both holes into the space between the two panels which are joined together.

I claim:

1. A self-sealing expansion rivet assembly for use with aligned panel holes in a plurality of panels which are to be joined together, each panel having an outer surface and an inner surface, said panels being arranged so that an inner surface of one confronts the outer surface of another, said assembly comprising:

a plastic rivet having an expandable rivet shank, said rivet shank comprising a head end and an insertion end and an expendable portion therebetween, a rivet head at said head end of said rivet shank for juxtaposition with the outer surface of one of said panels, and a rivet bore open at opposite ends extending through said rivet head and through said rivet shank, said rivet bore comprising a bore portion of reduced diameter near the head end of said rivet shank;

a drive pin comprising a pin shank insertable in said rivet bore from said insertion end of said rivet shank and having a pin head at one end of said pin shank engageable with the exterior of said insertion end of said rivet shank for effecting expansion of said rivet shank when said drive pin is forced through said rivet bore to an installed position so that said expanded rivet shank is juxtaposed with the inner surface of another of said panels, said pin shank comprising a first portion having serrations thereon and a second break-away portion, said serrations having a greater diameter than said reduced diameter bore portion but a smaller diameter than said rivet bore;

said reduced diameter bore portion being interengageable with said serrations on said pin shank for maintaining said drive pin in said installed position and for maintaining said rivet shank expanded;

and integrally formed sealing means on said rivet between said rivet head and said expandable portion of said rivet shank for abutting the outer surface of at least one of said plurality of panels and to seal the hole therein when said drive pin is in installed position and said rivet shank is expanded, said sealing means comprising at least one annular shaped outwardly extending flexible sealing flange on said rivet shank, said flange having conically shaped inner and outer surfaces.

2. A self-sealing expansion rivet assembly according to claim 1 wherein said sealing flange is disposed immediately adjacent said rivet head for engagement with the outer surface of said one panel.

3. A self-sealing expansion rivet assembly for use with aligned panels holes in a plurality of panels which are to be joined together, each panel having an outer surface and an inner surface, said panels being arranged so that an inner surface of one confronts the outer surface of another, said assembly comprising:

a plastic rivet having an expdndable rivet shank, said rivet shank comprising a head end and an insertion end and an expandable portion therebetween a rivet head at said head end of said rivet shank for juxtaposition with the outer surface of one of said panels, and a rivet bore extending through said rivet head and through said rivet shank;

a drive pin comprising a pin shank insertable in said rivet bore from said insertion end of said rivet shank and having a pin head at one end of said pin shank engageable with said insertion end of said rivet shank for effecting expansion of said rivet shank when said drive pin is forced through said rivet bore to an installed position so that said expanded rivet shank is juxtaposed with the inner surface of another of said panels;

interengageable means in said rivet bore and on said pin shank for maintaining said drive pin in said installed position and for maintaining said rivet shank expanded;

and integrally formed sealing means on said rivet between said rivet head and said expandable portion of said rivet shank for abutting the outer surface of at least one of said plurality of panels and to seal the hole therein when said drive pin is in installed position and said rivet shank is expanded, said sealing means comprising at least one annular shaped outwardly extending flexible sealing flange on said rivet shank, said flange having conically shaped inner and outer surfaces, said sealing flange being of no greater diameter when unflexed than the diameter of a portion of said rivet between said rivet head and said expandable portion of said rivet shank which is insertable in the hole in said one panel and is spaced from said rivet head by an axial distance substantially equal to the thickness of said one panel so that said sealing flange is engageable with the outer surface of said other panel.

4. A self-sealing expansion rivet assembly for use with aligned panel holes in a plurality of panels which are to be joined together, each panel having an outer surface and an inner surface, said panels being arranged so that an inner surface of one confronts the outer surface of another, said assembly comprising:

a plastic rivet having an expandable rivet shank, said rivet shank comprising a head end and an insertion end and an expandable portion therebetween, a rivet head at said head end of said rivet shank for juxtaposition with the outer surface of one of said panels, and a rivet bore extending through said rivet head and through said rivet shank;

a drive pin comprising a pin shank insertable in said rivet bore from said insertion end of said rivet shank and having a pin head at one end of said pin shank engageable with said insertion end of said rivet shank for effecting expansion of said rivet shank when said drive pin is forced through said rivet bore to an installed position so that said expanded rivet shank is juxtaposed with the inner surface of another of said panels;

interengageable means in said rivet bore and on said pin shank for maintaining said drive pin in said installed position and for maintaining said rivet shank expanded;

and integrally formed sealing means on said rivet between said rivet head and said expandable portion of said rivet shank for abutting the outer surface of at least one of said plurality of panels and to seal the hole therein when said drive pin is in installed position and said rivet shank is expaned, said sealing means comprising at least one annular shaped outwardly extending flexible sealing flange on said rivet shank, said flange having conically shaped inner and outer surfaces, said sealing means comprising a first sealing flange disposed immediately adjacent said rivet head for engagement with the outer surface of said one panel to seal the hole therein and a second sealing flange which is of no greater diameter when unflexed than the diameter of a portion of said rivet between said rivet head and said expandable portion of said rivet shank which is insertable in the hole in said one panel and is spaced from said rivet head by an axial distance substantially equal to the thickness of said one panel so that said second sealing flange is engageable with the outer surface of said other panel to seal the hole therein.

* * * * *